(12) United States Patent
Steynberg et al.

(10) Patent No.: US 8,106,102 B2
(45) Date of Patent: Jan. 31, 2012

(54) PROCESS FOR THE PREPARATION AND CONVERSION OF SYNTHESIS GAS

(75) Inventors: Andre Peter Steynberg, Vanderbijlpark Gauteng Province (ZA); Ib Dybkjaer, Copenhagen (DK); Kim Aasberg-Petersen, Alleroed (DK)

(73) Assignees: Sasol Technology (Proprietary) Limited, Johannesburg (ZA); Haldor Topsøe A/S, Lyngby (DK)

( * ) Notice: Subject to any disclaimer, the term of this patent is extended or adjusted under 35 U.S.C. 154(b) by 644 days.

(21) Appl. No.: 11/922,380

(22) PCT Filed: Jun. 14, 2006

(86) PCT No.: PCT/IB2006/001588
§ 371 (c)(1), (2), (4) Date: Feb. 27, 2009

(87) PCT Pub. No.: WO2006/134471
PCT Pub. Date: Dec. 21, 2006

(65) Prior Publication Data
US 2009/0186952 A1    Jul. 23, 2009

(30) Foreign Application Priority Data
Jun. 14, 2005   (ZA) .................................. 2005/4868

(51) Int. Cl.
*C07C 27/00* (2006.01)

(52) U.S. Cl. ........ 518/705; 518/700; 518/703; 518/704; 518/715

(58) Field of Classification Search .................. 518/700, 518/703, 704, 705, 715
See application file for complete search history.

(56) References Cited

U.S. PATENT DOCUMENTS
2003/0018086 A1    1/2003  Price

FOREIGN PATENT DOCUMENTS

| | | |
|---|---|---|
| GB | 2168719 | 6/1986 |
| WO | 01/60773 | 8/2001 |
| WO | 03/083013 | 10/2003 |
| WO | 2004/096952 | 11/2004 |

*Primary Examiner* — Jafar Parsa
(74) *Attorney, Agent, or Firm* — Hueschen and Sage

(57) ABSTRACT

A process (10) for the preparation and conversion of synthesis gas includes reforming a feed gas (34) comprising methane in a reforming stage (18) to produce synthesis gas (46) which includes hydrogen and carbon monoxide. Some of the hydrogen and carbon monoxide is converted to a Fischer-Tropsch product (48) in a Fischer-Tropsch hydrocarbon synthesis stage (24). A tail gas (52), including unreacted hydrogen and carbon monoxide, methane and carbon dioxide, is separated from the Fischer-Tropsch product (48). In a tail gas treatment stage (28,30), the tail gas (52) is treated by reforming the methane in the tail gas (52) with steam (66) and removing carbon dioxide to produce a hydrogen rich gas (56). The tail gas treatment stage (28,30) may be either a combined tail gas treatment stage (28,30) or a composite tail gas treatment stage. The carbon dioxide from the tail gas treatment stage (28,30) is fed to the reforming stage (18).

25 Claims, 2 Drawing Sheets

PROCESS FOR THE PREPARATION AND CONVERSION OF SYNTHESIS GAS

Figure 1:
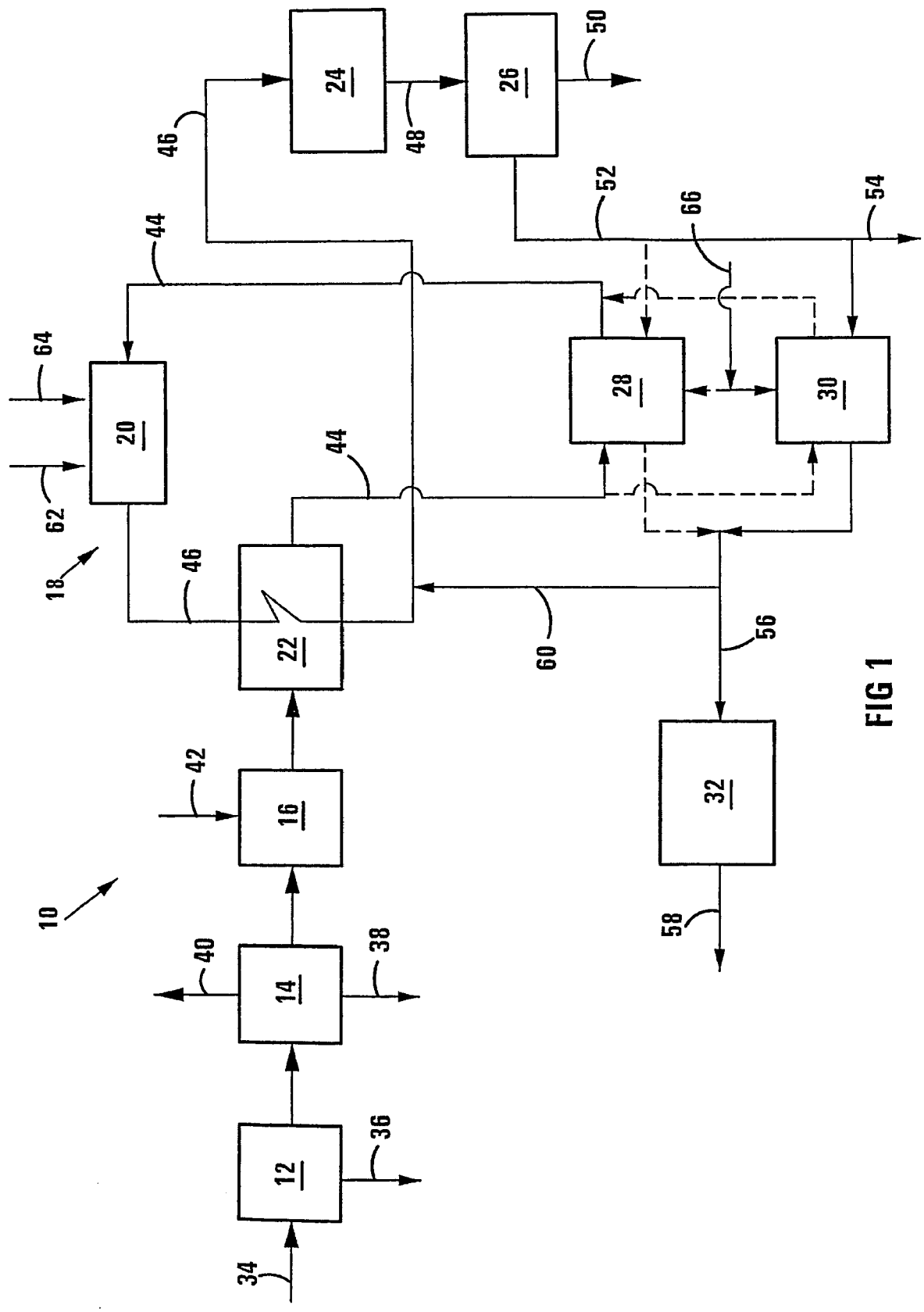

THIS INVENTION relates to a process for the preparation and conversion of synthesis gas.

In a conventional Fischer-Tropsch process to convert natural gas to liquid hydrocarbons, heavier hydrocarbons containing three or more carbon atoms (C3+ hydrocarbons) are typically removed from the natural gas using a cooling and separation process. In some cases C2+ hydrocarbons may be recovered using cryogenic cooling if there is a nearby facility for the conversion of ethane to ethylene, a valuable monomer or chemical industry feedstock. The lean natural gas is then treated to remove carbon dioxide in situations where $CO_2$ is present in high concentrations. The gas is also sweetened by removing sulphur compounds. The sulphur removal step may be integrated with the $CO_2$ removal step, if present, and will typically also include a sulphur adsorption step to ensure very low sulphur levels to protect downstream catalysts from sulphur poisoning. The resultant clean, lean natural gas is then reacted with steam and oxygen and recycled gases in a reformer or reforming stage to produce a synthesis gas including hydrogen and carbon monoxide. Currently the preferred approach is to use autothermal reforming. In the absence of the recycled gases to the reforming stage, the hydrogen content in the synthesis gas is typically too high for optimal use in a downstream low temperature Fischer-Tropsch hydrocarbon synthesis stage. In the Fischer-Tropsch hydrocarbon synthesis stage, the synthesis gas is reacted using a Fischer-Tropsch catalyst to produce hydrocarbon products consisting of a range of recovered compounds containing from one carbon atom to over 100 carbon atoms. Low temperature Fischer-Tropsch processes are well-known in the art for applications using synthesis gas that may be derived from a variety of carbon-containing feedstock sources, e.g. coal, petroleum coke, biomass, natural gas and the like. Typically about 90% of the hydrogen and carbon monoxide in the synthesis gas feed to the hydrocarbon synthesis stage will react in the hydrocarbon synthesis stage to produce products and the remaining about 10% ends up in a tail gas including methane, carbon dioxide, inert gases such as nitrogen and argon, and some residual C2+ hydrocarbons (after the recovery of the majority of the hydrocarbons by cooling reactor effluent gas to yield liquid products and residual tail gas). Some of the C2+ hydrocarbons may be unsaturated. The tail gas from the Fischer-Tropsch hydrocarbon synthesis stage generally contains residual unreacted hydrogen and carbon monoxide in a typical ratio of about 1 but possibly up to about 2.

Some methane is produced by the Fischer-Tropsch hydrocarbon synthesis process and some of the methane in the tail gas is derived from methane that passed unconverted through the synthesis gas preparation step and the hydrocarbon synthesis stage. For cobalt catalyst (a so-called non-shifting catalyst) most of the carbon dioxide in the tail gas is derived from the reforming stage. Irrespective of the catalyst used, carbon dioxide is typically the largest volume component of the tail gas.

For the optimum selectivity performance in the Fischer-Tropsch hydrocarbon synthesis stage it is desirable for the hydrogen to carbon monoxide ratio in the fresh synthesis gas feed to be less than 2.1 and preferably less than 2.0, preferably about 1.9 for cobalt catalyst and about 1.5 for iron catalyst. As mentioned above, in the absence of recycle to the reforming stage the synthesis gas composition would contain more hydrogen and less CO than desired. A conventional solution is to either recycle the tail gas from the Fischer-Tropsch hydrocarbon synthesis stage to the reforming stage or to feed carbon dioxide (which may optionally be derived from the tail gas) to the reforming stage to promote the reverse shift reaction of $CO_2$ with $H_2$ to produce $H_2O$ and CO. Typically tail gas recycle is the preferred approach because carbon dioxide separation is expensive and the carbon dioxide is generally available at very low pressure so that compression costs are high. Residual tail gas not being recycled is typically used as a fuel gas and burned to satisfy process heating duties in the plant such as preheating feed gases in the reforming stages and the superheating of steam. In the absence of recycle of tail gas to the reforming stage there is an increased loss of hydrogen and carbon dioxide to the fuel gas system which is undesirable. On the other hand, excessive recycle of tail gas to the reforming stage may lead to an undesirable build-up of inert gases and/or a lower than optimal hydrogen to carbon monoxide ratio in the synthesis gas.

It would be desirable to increase the hydrogen content and decrease the content of all gases that are non-reactive in Fischer-Tropsch synthesis, including methane, and also the carbon dioxide content in the tail gas from the Fischer-Tropsch hydrocarbon synthesis stage so that the reactants in the tail gas can be recycled to the Fischer-Tropsch hydrocarbon synthesis stage. It would also be desirable to separate an inert-free carbon dioxide stream at high pressure for recycle to the reforming stage.

According to a first aspect of the invention, there is provided a process for the preparation and conversion of synthesis gas which includes in a reforming stage, reforming a feed gas which includes methane to produce synthesis gas which includes hydrogen and carbon monoxide;

in a Fischer-Tropsch hydrocarbon synthesis stage, converting some of the hydrogen and carbon monoxide into Fischer-Tropsch product;

separating a tail gas which includes unreacted hydrogen and carbon monoxide, methane and carbon dioxide, from the Fischer-Tropsch product;

in a combined tail gas treatment stage which includes methane reforming and water gas shift catalyst, and carbon dioxide sorbent, treating the tail gas by reforming the methane in the tail gas in the presence of steam to produce hydrogen and carbon dioxide, with the carbon dioxide being absorbed or adsorbed by the carbon dioxide sorbent to produce a hydrogen rich gas; and from time to time, desorbing the carbon dioxide from the carbon dioxide sorbent and feeding the carbon dioxide to the reforming stage.

According to a second aspect of the invention, there is provided a process for the preparation and conversion of synthesis gas which includes in a reforming stage, reforming a feed gas which includes methane to produce synthesis gas which includes hydrogen and carbon monoxide;

in a Fischer-Tropsch hydrocarbon synthesis stage, converting some of the hydrogen and carbon monoxide into Fischer-Tropsch product;

separating a tail gas which includes unreacted hydrogen and carbon monoxide, methane and carbon dioxide, from the Fischer-Tropsch product;

in a composite tail gas treatment stage, treating the tail gas by reforming the methane in the tail gas in the presence of steam to produce a reformed tail gas which includes hydrogen, carbon dioxide and carbon monoxide, and thereafter removing carbon dioxide from the reformed tail gas to produce a hydrogen rich stream and a carbon dioxide rich stream; and feeding the carbon dioxide rich stream to the reforming stage.

In this specification, the term "hydrocarbon" is used broadly to include saturated and unsaturated hydrocarbons and carbon- and hydrogen-containing compounds that also include oxygen, i.e. oxygenated hydrocarbons such as alcohols, ketones, aldehydes and carboxylic acids.

The process may include a hydrogenation stage in which unsaturated compounds in the tail gas are hydrogenated upstream of the combined tail gas treatment stage or of the composite tail gas treatment stage. The hydrogenation stage may include any suitable type of reactor, if required with recycle of hydrogenated gas over the reactor or cooled by suitable means to control the outlet temperature. The hydrogenation catalyst may be based on copper or on noble metals, and it may be provided in the form of pellets or as catalysed structured elements or as a layer on heat exchange surfaces.

The process typically includes mixing steam with the tail gas. When a hydrogenation step is included, the steam is usually added after the hydrogenation unit. The steam may be mixed with the tail gas in a volume ratio of steam to methane plus carbon monoxide of at least 1. Preferably, this volume ratio is less than 3. Typically, in the Fischer-Tropsch hydrocarbon synthesis stage, steam is produced as a result of removing the reaction heat of the Fischer-Tropsch reactions taking place. The steam mixed with the tail gas may thus be obtained from the Fischer-Tropsch hydrocarbon synthesis stage.

When a combined tail gas treatment stage is used, the process typically includes at least two of the combined tail gas treatment stages, with at least one of the combined tail gas treatment stages being used to treat the tail gas to produce the hydrogen rich gas, while at least one of the other combined tail gas treatment stages is being used to produce carbon dioxide for feeding to the reforming stage by desorbing the carbon dioxide from the carbon dioxide sorbent.

In the combined tail gas treatment stage, the methane reforming and water gas shift catalyst, and the carbon dioxide sorbent are preferably in the form of a composite material, typically a composite particulate material. The carbon dioxide sorbent is thus a material capable of reacting with or absorbing or adsorbing carbon dioxide reversibly, and the catalyst is a material active for methane reforming and water gas shift reactions. The composite material may have a carbon dioxide sorbent core encased in a porous shell (typically alumina) that serves as a catalyst support. An example of a suitable carbon dioxide sorbent is calcium oxide or potassium carbonate promoted hydrotalcite. An example of a suitable methane reforming and water gas shift catalyst is a commercial nickel-based reforming catalyst. Alternatively, noble metal reforming catalysts may be used.

In the combined tail gas treatment stage being used to treat the tail gas, the excess steam, together with the absorption or adsorption of carbon dioxide, ensures a high conversion of both methane and carbon monoxide to hydrogen, thereby to produce the hydrogen rich gas.

The combined tail gas treatment stage may be operated at a temperature of at least about 350° C. and of not more than about 650° C. when treating tail gas to produce the hydrogen rich gas.

The carbon dioxide may be desorbed or stripped from the carbon dioxide sorbent in the combined tail gas treatment stage by a stripping gas at a temperature of at least about 650° C., possibly at a temperature up to about 750° C. or 800° C. Typically, the stripping gas is reformer feed gas or partially reformed reformer feed gas.

In the composite tail gas treatment stage, the reforming of methane in the presence of steam may be effected using standard steam reforming technology, including conventional steam reforming in a fired heater, convection reforming, wherein the heat for the reforming reactions is provided by heat exchange with a hot gas, e.g. a flue gas, or heat exchange reforming, wherein the heat for the reforming reactions is provided by heat exchange with a hot process gas, e.g. the exit gas from the reforming stage. The reforming catalyst may be based on nickel or on noble metals, and it may be provided in the form of pellets or as catalysed structured elements or as a layer on heat exchange surfaces.

The hydrogen rich gas produced in the composite tail gas treatment stage as described heretofore, is also rich in carbon monoxide. If desired, the composite tail gas treatment stage may include converting the carbon monoxide in the reformed tail gas stream using water gas shift reaction to produce hydrogen and carbon dioxide. The conversion may be carried out in any known type of converter applicable for exothermic reactions including adiabatic reactors and cooled reactors cooled by steam production, by heating of water, or by heating of gas. The carbon monoxide conversion catalyst may be based on copper or on iron or on any other suitable material as known to those experienced in the art, and it may be provided in the form of pellets or as catalysed structured elements or as a layer on the heat exchange surface.

In the composite tail gas treatment stage, the steam reforming and the optional carbon monoxide conversion may ensure a high conversion of both methane and carbon monoxide, thereby producing a hydrogen rich gas. If the carbon monoxide conversion step is omitted, then the process may produce a hydrogen rich gas which is also rich in carbon monoxide. The operating conditions of the various steps of the composite tail gas treatment stage are chosen within limits well known to those experienced in the art.

The carbon dioxide removal process utilised in the composite tail gas treatment stage may be of any known type including removal by absorption in liquids such as solutions of potassium carbonate or amines, adsorption on solids such as molecular sieves, chemical retention by reaction with e.g. suitable oxides to form carbonates, in all cases followed by desorption of the carbon dioxide by suitable means as known to those experienced in the art, or by separation using selective membranes.

The carbon dioxide rich stream from the composite tail gas treatment stage may be at a low pressure. The process may then include compressing the carbon dioxide rich stream prior to feeding to the reforming stage.

The reforming stage may include an autothermal reformer. The autothermal reformer may be operated with a synthesis gas outlet temperature less than 1100° C. but above the temperature at which soot formation occurs. In one embodiment of the invention, this temperature is less than 1050° C., e.g. between about 850° C. and about 1050° C. Although such a lower synthesis gas outlet temperature tends to increase methane slip through the autothermal reformer, oxygen consumption by the autothermal reformer is lowered. Less CO and $H_2$ will also be produced, bearing in mind that the autothermal oxygen burning reforming process uses a catalyst that achieves a gas composition that is close to equilibrium at the operating temperature of the reformer.

The process may include a preheat stage (typically a preheat furnace) to preheat gas upstream of the autothermal reformer. Steam may be added to the gas upstream of the preheat furnace so that a molar ratio of steam to carbon greater than 0.3 is obtained in order to allow the gas to be preheated to a higher temperature without excessive coke formation in the preheat stage. The gas may be preheated to a temperature of between about 350° C. and about 800° C., preferably at least 650° C. It may further be an advantage to include a pre-reforming step upstream of the autothermal reformer as disclosed in U.S. Pat. No. 6,375,916, which by reference thereto is included herein. Advantageously, a higher steam to carbon molar ratio in the feed gas will decrease the methane slip in the autothermal reformer but typically increases oxygen consumption in the autothermal reformer. The increased oxygen consumption caused by the higher steam to carbon molar ratio is however less pronounced at lower reformer synthesis gas outlet temperatures, thus allowing a new operating point to be reached with a higher steam to carbon molar ratio in the feed gas, a lower autothermal reformer synthesis gas outlet temperature, a lower oxygen consumption in the autothermal reformer, and a higher methane slip through the reformer, than in conventional processes.

The reforming stage may include a gas heated reformer or heat exchange reformer, and an autothermal reformer, with the synthesis gas from the autothermal reformer being used to provide heat for the reforming reactions taking place in the gas heated reformer, and wherein the carbon dioxide from the tail gas treatment stage is fed to the autothermal reformer.

When both an autothermal reformer and a gas heated reformer are being used, the stripping gas used in the process according to the first aspect of the invention may be partially reformed feed gas from the gas heated reformer. The partially reformed feed gas may be at a temperature above 650° C. and possibly up to about 800° C.

The tail gas may be at a pressure of between 1 bar and 20 bar, typically about 10 bar.

Typically, a portion of the hydrogen rich gas produced in the tail gas treatment stage is added to the synthesis gas from the reforming stage to adjust the molar ratio of hydrogen and carbon monoxide in the synthesis gas. Preferably, the hydrogen and carbon monoxide molar ratio in the synthesis gas being fed to the Fischer-Tropsch hydrocarbon synthesis stage is less than 2.1, more preferably less than 2, most preferably about 1.9 for cobalt catalyst. In the case of iron catalyst, the hydrogen and carbon monoxide ratio preferably is about 1.5.

The process may include purging the tail gas from the Fischer-Tropsch hydrocarbon synthesis stage, in order to avoid or address the build-up of inerts in the synthesis gas, or to avoid excess recycle of carbon dioxide.

If desired, a portion of the hydrogen rich gas may be further purified to produce a high purity hydrogen stream. Further purification of the hydrogen rich gas may be accomplished, for example, by feeding the hydrogen rich gas to a pressure swing adsorption stage to remove inerts. The process may then include recycling at least some of the high purity hydrogen stream to the Fischer-Tropsch hydrocarbon synthesis stage. In this way, the purging of tail gas from the Fischer-Tropsch hydrocarbon synthesis stage may be reduced.

Instead, or in addition, purged tail gas from the Fischer-Tropsch hydrocarbon synthesis stage may be combined with at least a portion of the high purity hydrogen stream, and/or with at least a portion of the hydrogen rich gas to produce a synthesis gas suitable for methanol synthesis and/or di-methyl-ether (DME) synthesis and/or Fischer-Tropsch hydrocarbon synthesis. The Fischer-Tropsch hydrocarbon synthesis using such a synthesis gas may be high temperature Fischer-Tropsch hydrocarbon synthesis or low temperature Fischer-Tropsch hydrocarbon synthesis.

The hydrogen rich and/or high purity hydrogen stream may also be used together with nitrogen from an air separation unit to produce ammonia. The air separation unit is typically present in a Fischer-Tropsch hydrocarbon synthesis process to separate nitrogen from air to provide oxygen to be fed to the reforming stage.

The feed gas typically is a hydrocarbon feedstock, typically natural gas, naphtha or a gas found in association with crude oil, comprising $CH_4$ as a major component and other hydrocarbons.

The Fischer-Tropsch hydrocarbon synthesis stage may include a synthesis reactor operating at a temperature of less than 280° C. Typically, the Fischer-Tropsch hydrocarbon synthesis stage includes a synthesis reactor operating at a temperature of between 160° C. and 280° C., preferably between 220° C. and 260° C., e.g. about 240° C. The Fischer-Tropsch hydrocarbon synthesis stage may thus be a high chain growth, typically slurry bed, reaction stage, operating at a predetermined operating pressure in the range 10 to 50 bar, e.g. about 30 bar.

The process may include desulphurisation or sweetening of the feed gas.

The invention will now be described, by way of example only, with reference to the accompanying diagrammatic drawings.

Figure 2:
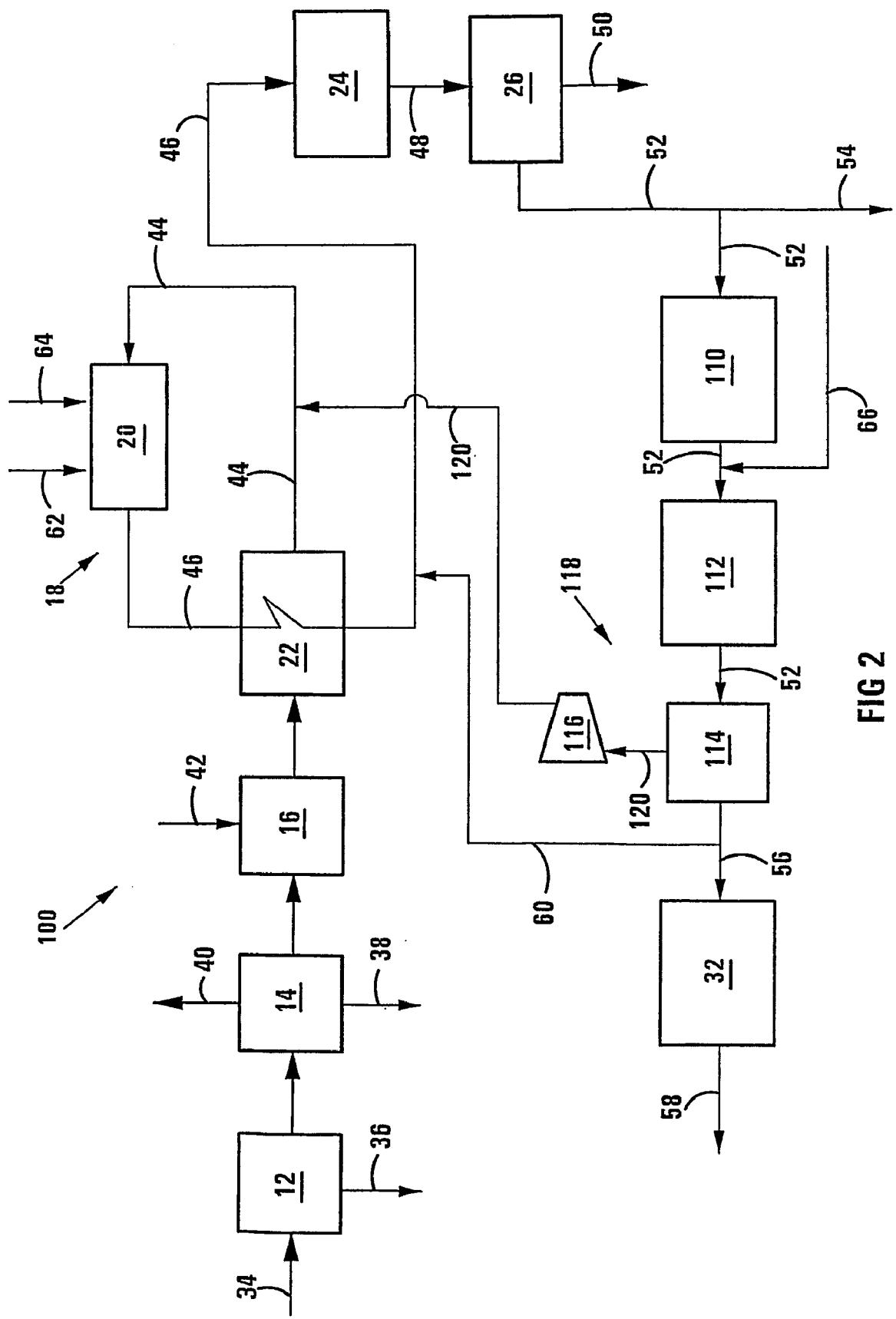

In the drawings:

FIG. 1 shows a Fischer-Tropsch process in accordance with the first aspect of the invention; and FIG. 2 shows a Fischer-Tropsch process in accordance with the second aspect of the invention.

Referring to FIG. 1, reference numeral 10 generally indicates a Fischer-Tropsch process in accordance with the first aspect of the invention for converting natural gas to valuable hydrocarbons. The process 10 includes a separation stage 12, a gas sweetening stage 14 and a preheat stage 16. A reforming stage, generally indicated by reference numeral 18 includes an oxygen-blown autothermal reformer 20 and a gas heated reformer 22. The process 10 further includes a Fischer-Tropsch hydrocarbon synthesis stage 24 followed by a product separation stage 26 and two combined tail gas treatment stages 28 and 30. A hydrogen purification stage 32 follows the combined tail gas treatment stages 28, 30.

A natural gas feed line 34 leads into the separation stage 12 and from there connects to the gas sweetening stage 14, the preheat stage 16 and the gas heated reformer 22. A C3+ line 36 leaves the separation stage 12 and a sulphur line 38 and an optional $CO_2$ line 40 leave the gas sweetening stage 14. A steam feed line 42 leads to the preheat stage 16.

From the gas heated reformer 22, a partially reformed gas line 44 leads to the combined tail gas treatment stages 28, 30 and from there to the autothermal reformer 20. From the autothermal reformer 20, a synthesis gas feed line 46 leads to the gas heated reformer 22 and from there to the Fischer-Tropsch hydrocarbon synthesis stage 24. The Fischer-Tropsch hydrocarbon synthesis stage 24 is connected to the product separation stage 26 by means of a feed line 48, with a Fischer-Tropsch products line 50 leaving the separation stage 26.

A tail gas line 52 leads from the product separation stage 26 to the combined tail gas treatment stages 28, 30, with a purge line 54 being provided.

A hydrogen rich gas line 56 leads from the combined tail gas treatment stages 28, 30 to the hydrogen purification stage 32, with a high purity hydrogen line 58 leaving the hydrogen purification stage 32.

A hydrogen recycle line 60 branches off from the hydrogen rich gas line 56 and leads into the synthesis gas feed line 46 feeding the Fischer-Tropsch synthesis stage 24.

The autothermal reformer 20 is provided with an oxygen feed line 62 and a steam feed line 64, and the combined tail gas treatment stages 28, 30 are provided with a steam feed line 66.

In use, natural gas comprising predominantly methane is fed by means of the natural gas feed line 34 to the separation stage 12. Heavier hydrocarbons containing three or more hydrocarbon atoms are separated from the natural gas using separation techniques such as cooling, and removed by means of the C3+ line 36. In some embodiments of the invention, C2+ hydrocarbons are also recovered using cryogenic cooling, e.g. if there is a nearby facility for the conversion of ethane to ethylene monomers.

Lean natural gas is fed from the separation stage 12 to the gas sweetening stage 14 where sulphur compounds are removed in conventional fashion, e.g. by means of a sulphur adsorption step. If desired, lean natural gas is also treated to remove carbon dioxide, e.g. where the carbon dioxide is present in the lean natural gas in high concentration. The removal of the sulphur and carbon dioxide are illustrated by the sulphur line 38 and the carbon dioxide line 40.

Clean, lean natural gas is fed into the preheat stage 16 where the natural gas is admixed with steam from the steam line 42 in a molar ratio of steam to carbon greater than 0.6. In the preheat stage 16, the admixture of natural gas and steam is heated (by means of a furnace) to a temperature of about 650° C. Care should however be taken to ensure that excessive coke formation does not occur in the preheat stage 16.

The methane in the preheated feed gas from the preheat stage 16 is partially reformed in the gas heated reformer 22. For steam to carbon ratios of 1.5 or higher, a conventional methane-reforming catalyst may be used in the gas heated reformer. If it is desired to use a lower steam to carbon ratio then it may be necessary to use a noble metal reforming catalyst in the gas heated reformer. If a noble metal reforming catalyst is used then it may be necessary to use an adiabatic prereformer upstream of the gas heated reformer in order to ensure the complete removal of sulphur compounds before the gas contacts the noble metal catalyst. The gas from the gas heated reformer 22 is thus partially reformed and includes more CO and $H_2$, and less methane, than the natural gas or prereformed natural gas fed to the gas heated reformer 22. The partially reformed feed gas from the gas heated reformer 22 is at a temperature of at least about 650° C.

The hot partially reformed gas from the gas heated reformer 22 is fed as a stripping gas to one of the combined tail gas treatment stages 28, 30. In the drawing, the stripping gas is shown as being fed to the combined tail gas treatment stage 28. The combined tail gas treatment stages 28, 30 each include a reactor filled with a composite particulate material which functions as a methane-reforming and water gas shift catalyst, and as a carbon dioxide sorbent. An example of a suitable composite material is calcium oxide or potassium carbonate promoted hydrotalcite, defining a core for the particulate material, with a commercial nickel-based reforming catalyst supported on a porous alumina shell. In one embodiment of the invention, the core of the particulate material comprises equal parts by weight of type S dolime and pulverised limestone with the alumina catalyst support comprising 29 weight % γ-alumina of grade CP-7, 28 weight % α-alumina of grade T-64 and 38 weight % α-alumina of grade A-16-SG, available from Almatis AC, Inc. The coated particulate material should be calcined at 800° C. for a few hours to partially sinter the shell material whereafter it can be impregnated with nickel catalyst from a solution of nickel nitrate in tetrahydrofuran and then calcined at 500° C. to decompose the nickel salt into nickel oxide. The impregnation step may be repeated a few times to increase the nickel content of the pellets.

The composite catalyst/sorbent material of the combined tail gas treatment stage 28 is at least partially saturated with carbon dioxide, as will be described in more detail hereinafter. The hot gas from the gas heated reformer 22 acts as a stripping gas causing inert free carbon dioxide to be desorbed from the composite material. Partially reformed gas with an increased carbon dioxide content is thus fed from the combined tail gas treatment stage 28 to the autothermal reformer 20 by means of the partially reformed gas line 44.

In the autothermal reformer 20, the methane in the gas is further reformed in the presence of steam and oxygen fed to the autothermal reformer 20 by means of the oxygen feed line 62 and the steam feed line 64, to form synthesis gas comprising mostly $H_2$ and CO, but also $CH_4$, $CO_2$ and $H_2O$. The autothermal reformer is operated with a synthesis gas outlet temperature of less than 1100° C. but above the temperature at which soot formation occurs, e.g. at a temperature of about 950° C. The hot synthesis gas from the autothermal reformer 20 is fed by means of the synthesis gas feed line 46 to the gas heated reformer 22 where the heat from the hot synthesis gas is used in indirect heat exchange relationship to provide energy for the reforming reactions taking place in the gas heated reformer 22.

From the gas heated reformer 22, the synthesis gas is fed to the Fischer-Tropsch hydrocarbon synthesis stage 24 by means of the synthesis gas feed line 46. The synthesis gas is however first enriched in hydrogen by means of hydrogen rich gas fed along the hydrogen recycle line 60, to ensure a desired molar ratio of hydrogen and carbon monoxide in the synthesis gas. When cobalt catalyst is used in the Fischer-Tropsch hydrocarbon synthesis stage 24, the hydrogen and carbon monoxide molar ratio should be about 1.9. When iron catalyst is used in the Fischer-Tropsch synthesis stage 24, the hydrogen and carbon monoxide molar ratio should be about 1.5. Although not shown in the drawing, water is typically also first removed by condensation before the synthesis gas is reheated and enriched with hydrogen prior to being fed into the Fischer-Tropsch hydrocarbon synthesis stage 24.

The Fischer-Tropsch hydrocarbon synthesis stage 24 includes a low temperature Fischer-Tropsch synthesis reactor operating at a temperature of about 240° C. and a pressure of about 30 bar. Typically, the reactor is a slurry phase reactor. The conversion of the synthesis gas into Fischer-Tropsch products in the Fischer-Tropsch hydrocarbon synthesis stage 24 is conventional and will not be described in any more detail.

From the Fischer-Tropsch hydrocarbon synthesis stage 24, the Fischer-Tropsch product including synthesis products and unreacted synthesis gas are removed as schematically indicated by the feed line 48 and fed to the product separation stage 26 where the Fischer-Tropsch products, whether gaseous or liquid, are separated in conventional fashion and are removed as schematically indicated by the Fischer-Tropsch products line 50. Typically, the products are separated into a liquid phase comprising heavy liquid hydrocarbons, and an overheads vapour phase comprising light hydrocarbon products, unreacted synthesis gas, water and soluble organic compounds such as alcohols. The liquid phase is then withdrawn and typically upgraded by means of hydroprocessing into more valuable products. The vapour phase is cooled and condensed to provide an aqueous phase comprising water and soluble organic compounds and a condensed product phase, typically comprising hydrocarbon products having three or more carbon atoms. A Fischer-Tropsch tail gas which includes methane is removed by means of the tail gas line 52 and fed to the combined tail gas treatment stage 30. A portion of the tail gas is however purged by means of the purge line 54. The purged portion of the tail gas can be used as a fuel gas and can be burned to satisfy process heating duties in the process 10, such as in the preheat stage 16. The Fischer-Tropsch tail gas is typically at a pressure of about 10 bar.

Steam is fed by means of the steam feed line 66 to the combined tail gas treatment stage 30 to provide a steam to methane plus carbon monoxide volume ratio of between 1 and 3. In the stage 30 the methane in the tail gas is reformed in the presence of steam to produce more hydrogen and carbon dioxide. The carbon dioxide is absorbed or adsorbed by the composite material in the combined tail gas treatment stage 30, thereby producing a hydrogen rich gas which is removed from the combined tail gas treatment stage 30 by means of the hydrogen rich gas line 56. The excess steam and the carbon dioxide absorption or adsorption ensure a high conversion of methane and carbon monoxide to hydrogen.

A portion of the hydrogen rich gas is recycled by means of the hydrogen recycle line 60, as hereinbefore described. The balance of the hydrogen rich gas is purified in the hydrogen purification stage 32 (for example, by means of a pressure swing adsorption process) to produce a high purity hydrogen stream which can be removed by means of the high purity hydrogen line 58.

As will be appreciated, at all times, one of the combined tail gas treatment stages 28, 30 is being used to reform methane in the tail gas and to absorb or adsorb $CO_2$ from the tail gas, and one of the combined tail gas treatment stages 28, 30 is being used to recycle desorbed $CO_2$ to the autothermal reformer 20. Before the composite material of the combined tail gas treatment stage 28, 30 being used for absorption or adsorption of $CO_2$ is saturated with $CO_2$, e.g. before all the calcium oxide is converted to calcium carbonate, the Fischer-Tropsch tail gas flow through the combined tail gas treatment stage 28, 30 is stopped and transferred to the other of the combined tail gas treatment stages 28, 30, and is replaced by the hot partially reformed gas from the gas heated reformer 22 to strip the $CO_2$ from the composite material. This switching of the flow of the tail gas and the hot partially reformed gas is indicated by the broken flow lines around the combined tail gas treatment stages 28, 30.

By using the combined tail gas treatment stages 28, 30, an inert free carbon dioxide recycle is provided to the autothermal reformer 20, which results in a synthesis gas that is suitable for Fischer-Tropsch synthesis after it has been mixed with the hydrogen rich gas recycle from the combined tail gas treatment stages 28, 30.

In order to prevent the recycle of excessive carbon dioxide and to avoid the build-up of inerts due to the hydrogen rich recycle, some of the Fischer-Tropsch tail gas can be purged by means of the purge line 54, as hereinbefore described. In order to minimise this purge, it may be desirable to recycle some of the high purity hydrogen from the hydrogen purification stage 32 to the Fischer-Tropsch hydrocarbon synthesis stage 24. Alternatively, or in addition, the purged tail gas may be combined with the high purity hydrogen stream from the hydrogen purification stage 34 and/or the hydrogen rich stream from the combined tail gas treatment stages 28, 30 to produce a synthesis gas suitable for methanol and/or di-methyl-ether (DME) synthesis or for Fischer-Tropsch synthesis, which may then be high temperature or low temperature Fischer-Tropsch synthesis.

Referring now to FIG. 2, reference numeral 100 generally indicates a Fischer-Tropsch process in accordance with the second aspect of the invention for converting natural gas to valuable hydrocarbons. Unless otherwise indicated, parts or features of the process 100 that are the same or similar to parts or features of process 10 are indicated by the same reference numerals.

In the process 100, the tail gas line 52 leads from the product separation stage 26 to a hydrogenation stage 110, and then on to a composite tail gas treatment stage 118. The composite tail gas treatment stage 118 itself includes a steam methane reformer 112, a carbon dioxide removal unit 114 and a carbon dioxide compressor 116. The hydrogen rich gas line 56 leads from the carbon dioxide removal unit 114. A carbon dioxide rich gas line 120 leads from carbon dioxide removal unit 114 to the carbon dioxide compressor 116 and then joins the partially reformed gas line 44 leading from the gas heated reformer 22 to the autothermal reformer 20.

In use, the tail gas from the product separation stage 26 in line 52 is hydrogenated in hydrogenation stage 110 to remove any unsaturated compounds. The hydrogenated tail gas in line 52 from the hydrogenation stage 110 is then mixed with steam from the steam feed line 66 to provide a steam to methane plus carbon monoxide volume ratio of between 0.3 and 3, before the methane in the tail gas is reformed in the presence of steam in the steam reformer 112 to produce more hydrogen, carbon monoxide, and carbon dioxide. The steam reformer 112 is conventional.

The reformed tail gas in line 52 from the steam reformer 112 is then subjected to carbon dioxide removal in the carbon dioxide removal unit 114 to produce a carbon dioxide rich gas removed along line 120 and a hydrogen rich gas removed along line 56. The carbon dioxide removal unit 114 is conventional and is based on absorption of the carbon dioxide in an amine solution and release of the carbon dioxide by heating of the loaded solvent combined with pressure reduction. The recovered carbon dioxide rich gas is at low pressure and is suitably compressed in the carbon dioxide compressor 116 before joining the feed to the autothermal reformer 20.

By using the composite tail gas treatment stage 118, a carbon dioxide recycle is provided to the autothermal reformer 20, which results in a synthesis gas that is suitable for Fischer-Tropsch synthesis after it has been mixed with the hydrogen rich gas recycle in line 60 from the composite tail gas treatment stage 118.

The thermal efficiency of the processes 10 and 100 is enhanced by the use of the gas heated reformer 22 upstream of the autothermal reformer 20. Advantageously, the heat at the exit of the autothermal reformer 20 is used to drive the steam reforming reaction in the gas heated reformer 22 and increases the scope for carbon dioxide recycle to the autothermal reformer 20. Unlike prior art processes of which the Applicant is aware, in which the build-up of inerts in higher tail gas recycle to the autothermal reformer is often problematic for gas heated reformer applications, the process of the present invention does not suffer from this problem due to the fact that the carbon dioxide that is recycled is for practical purposes inert-free.

With the processes 10, 100 of the present invention, as illustrated above, the optimum ratio of steam to carbon fed to the reforming stage 18 may increase which may have beneficial consequences for the required materials of construction and/or catalyst cost for the gas heated reformer 22. Furthermore, the processes 10, 100, as illustrated, increases methane conversion and provides a hydrogen rich product stream which can be used to process primary Fischer-Tropsch hydrocarbon products.

The Applicant believes that the processes 10, 100, as illustrated, can significantly improve the yield of hydrocarbon products per unit of natural gas and oxygen feed in a cost-effective manner for a gas to liquids (GTL) process.

The invention claimed is:

1. A process for the preparation and conversion of synthesis gas which includes
in a feed gas reforming stage, reforming a feed gas which includes methane to produce synthesis gas which includes hydrogen and carbon monoxide;
in a Fischer-Tropsch hydrocarbon synthesis stage, converting some of the hydrogen and carbon monoxide into a Fischer-Tropsch product;
separating a tail gas which includes unreacted hydrogen and carbon monoxide, methane and carbon dioxide, from the Fischer-Tropsch product;
in a tail gas treatment stage which includes methane reforming and water gas shift catalyst, and carbon dioxide sorbent, treating the tail gas by reforming the methane in the tail gas in the presence of steam to produce hydrogen and carbon dioxide, with at least some of the carbon dioxide being absorbed or adsorbed by the carbon dioxide sorbent to produce a hydrogen rich gas; and
from time to time, desorbing the carbon dioxide from the carbon dioxide sorbent and feeding the carbon dioxide to the feed gas reforming stage in which the feed gas is reformed.

2. The process as claimed in claim 1, which includes at least two of the tail gas treatment stages, with at least one of the tail gas treatment stages being used to treat the tail gas to produce the hydrogen rich gas, while at least one of the other tail gas treatment stages is being used to produce carbon dioxide for feeding to the feed gas reforming stage by desorbing the carbon dioxide from the carbon dioxide sorbent.

3. The process as claimed in claim 1, in which the methane reforming and water gas shift catalyst, and the carbon dioxide sorbent are in the form of a composite material.

4. The process as claimed in claim 3, in which the composite material has a carbon dioxide sorbent core encased in a porous shell that serves as a catalyst support.

5. The process as claimed in claim 1, in which the tail gas treatment stage is operated at a temperature of at least about 350° C. and of not more than about 650° C. when treating the tail gas to produce the hydrogen rich gas.

6. The process as claimed in claim 1, in which the carbon dioxide is desorbed or stripped from the carbon dioxide sorbent by a stripping gas at a temperature of at least about 650° C.

7. The process as claimed in claim 6, in which the stripping gas is reformer feed gas or partially reformed reformer feed gas.

8. The process as claimed in claim 1, in which the feed gas reforming stage includes a gas heated reformer or heat exchange reformer, and an autothermal reformer, with the synthesis gas from the autothermal reformer being used to provide heat for the reforming reactions taking place in the gas heated reformer, and wherein the carbon dioxide from the tail gas treatment stage is fed to the autothermal reformer.

9. The process as claimed in claim 8, in which a stripping gas is used to desorb carbon dioxide from the sorbent, and in which the stripping gas is partially reformed feed gas from the gas heated reformer.

10. The process as claimed in claim 1, in which a portion of the hydrogen rich gas is added to the synthesis gas from the feed gas reforming stage to adjust the molar ratio of hydrogen and carbon monoxide in the synthesis gas.

11. The process as claimed in claim 1, in which a portion of the hydrogen rich gas is further purified to produce a high purity hydrogen stream, and which includes recycling at least some of the high purity hydrogen stream to the Fischer-Tropsch hydrocarbon synthesis stage.

12. The process as claimed in claim 1, in which a portion of the hydrogen rich gas is further purified to produce a high purity hydrogen stream, and in which purged tail gas from the Fischer-Tropsch hydrocarbon synthesis stage is combined with at least a portion of the high purity hydrogen stream, and/or with at least a portion of the hydrogen rich gas to produce a synthesis gas suitable for methanol synthesis and/or di-methyl-ether (DME) synthesis and/or Fischer-Tropsch hydrocarbon synthesis.

13. The process as claimed in claim 1, in which a portion of the hydrogen rich gas is further purified to produce a high purity hydrogen stream, and in which the hydrogen rich gas and/or high purity hydrogen stream is used together with nitrogen from an air separation unit to produce ammonia.

14. The process as claimed in claim 1, which includes a hydrogenation stage in which unsaturated compounds in the tail gas are hydrogenated upstream of the tail gas treatment stage.

15. A process for the preparation and conversion of synthesis gas which includes
in a feed gas reforming stage, reforming a feed gas which includes methane to produce synthesis gas which includes hydrogen and carbon monoxide;
in a Fischer-Tropsch hydrocarbon synthesis stage, converting some of the hydrogen and carbon monoxide into Fischer-Tropsch product;
separating a tail gas which includes unreacted hydrogen and carbon monoxide, methane and carbon dioxide, from the Fischer-Tropsch product;
in a tail gas treatment stage, treating the tail gas by reforming the methane in the tail gas in the presence of steam to produce a reformed tail gas which includes hydrogen, carbon dioxide and carbon monoxide, and thereafter removing carbon dioxide from the reformed tail gas to produce a hydrogen rich gas and a carbon dioxide rich stream; and
feeding the carbon dioxide rich stream to the feed gas reforming stage in which the feed gas is reformed.

16. The process as claimed in claim 15, in which the feed gas reforming stage includes a gas heated reformer or heat exchange reformer, and an autothermal reformer, with the synthesis gas from the autothermal reformer being used to provide heat for the reforming reactions taking place in the gas heated reformer, and wherein the carbon dioxide from the tail gas treatment stage is fed to the autothermal reformer.

17. The process as claimed in claim 16, in which a stripping gas is used to desorb carbon dioxide from the sorbent, and in which the stripping gas is partially reformed feed gas from the gas heated reformer.

18. The process as claimed in claim 15, in which a portion of the hydrogen rich gas is added to the synthesis gas from the feed gas reforming stage to adjust the molar ratio of hydrogen and carbon monoxide in the synthesis gas.

19. The process as claimed in claim 15, in which a portion of the hydrogen rich gas is further purified to produce a high purity hydrogen stream, and which includes recycling at least some of the high purity hydrogen stream to the Fischer-Tropsch hydrocarbon synthesis stage.

20. The process as claimed in claim 15, in which a portion of the hydrogen rich gas is further purified to produce a high purity hydrogen stream, and in which purged tail gas from the Fischer-Tropsch hydrocarbon synthesis stage is combined with at least a portion of the high purity hydrogen stream, and/or with at least a portion of the hydrogen rich gas to produce a synthesis gas suitable for methanol synthesis and/or di-methyl-ether (DME) synthesis and/or Fischer-Tropsch hydrocarbon synthesis.

21. The process as claimed in claim 15, in which a portion of the hydrogen rich gas is further purified to produce a high purity hydrogen stream, and in which the hydrogen rich gas and/or high purity hydrogen stream is used together with nitrogen from an air separation unit to produce ammonia.

22. The process as claimed in claim 15, in which the tail gas treatment stage includes converting the carbon monoxide in the reformed tail gas using water gas shift reaction to produce hydrogen and carbon dioxide; and in which the carbon dioxide rich steam is compressed before feeding to the feed gas reforming stage.

23. The process as claimed in claim 15, which includes a hydrogenation stage in which unsaturated compounds in the tail gas are hydrogenated upstream of the tail gas treatment stage.

24. A process for the preparation and conversion of synthesis gas which includes
- in a reforming stage, reforming a feed gas which includes methane to produce synthesis gas which includes hydrogen and carbon monoxide;
- in a Fischer-Tropsch hydrocarbon synthesis stage, converting some of the hydrogen and carbon monoxide into a Fischer-Tropsch product;
- separating a tail gas which includes unreacted hydrogen and carbon monoxide, methane and carbon dioxide, from the Fischer-Tropsch product;
- in a tail gas treatment stage which includes methane reforming and water gas shift catalyst, and carbon dioxide sorbent, treating the tail gas by reforming the methane in the tail gas in the presence of steam to produce hydrogen and carbon dioxide, with at least some of the carbon dioxide being absorbed or adsorbed by the carbon dioxide sorbent to produce a hydrogen rich gas, the methane reforming and water gas shift catalyst, and the carbon dioxide sorbent being in the form of a composite material; and
- from time to time, desorbing the carbon dioxide from the carbon dioxide sorbent and feeding the carbon dioxide to the reforming stage.

25. The process as claimed in claim 24, in which the composite material has a carbon dioxide sorbent core encased in a porous shell that serves as a catalyst support.

* * * * *